United States Patent
Singleton et al.

(10) Patent No.: US 10,604,258 B2
(45) Date of Patent: Mar. 31, 2020

(54) CART STOWAGE PLACARD ENABLING PLATE

(71) Applicant: The Boeing Company, Chicago, IL (US)

(72) Inventors: Christopher B. Singleton, Lake Stevens, WA (US); Joshua Y. Lee, Seattle, WA (US); Emmanuel A. Garcia, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 561 days.

(21) Appl. No.: 15/233,606

(22) Filed: Aug. 10, 2016

(65) Prior Publication Data

US 2018/0044021 A1    Feb. 15, 2018

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01)

(58) Field of Classification Search
CPC ................ B64D 11/0007; B64D 11/04; Y10T 403/32041; Y10T 403/32057
See application file for complete search history.

(56) References Cited

U.S. PATENT DOCUMENTS

| | | | |
|---|---|---|---|
| 2005/0081418 A1* | 4/2005 | Fast | A47F 5/0869 40/661 |
| 2005/0224646 A1 | 10/2005 | Mills | |
| 2011/0090064 A1* | 4/2011 | Dahms | B64D 11/04 340/10.42 |
| 2013/0269545 A1* | 10/2013 | Cunningham | B30B 9/301 100/35 |
| 2015/0069179 A1 | 3/2015 | Ehlers et al. | |
| 2015/0314872 A1 | 11/2015 | Holtorf et al. | |

FOREIGN PATENT DOCUMENTS

| | | |
|---|---|---|
| DE | 102007029677 B | 1/2009 |
| JP | 2015051741 A | 3/2015 |
| WO | 2016034531 A | 3/2016 |

* cited by examiner

*Primary Examiner* — Jessica B Wong
(74) *Attorney, Agent, or Firm* — Felix L. Fischer

(57) ABSTRACT

A retractable placard system for galley cart storage bays is provided. The placard system includes an outer plate and a placard. The outer plate is mounted with a hinge to a surface of a cart storage bay and is adapted to depend substantially vertically from the surface in a first position and to rotate in a first direction upon contact by a first edge of a half size cart. The placard is mounted to the outer plate. The placard is visible in the bay with the outer plate in the first position and retracted with the outer plate rotated in the first direction to a second position.

20 Claims, 15 Drawing Sheets

CART STOWAGE PLACARD ENABLING PLATE

BACKGROUND INFORMATION

Field

Embodiments of the disclosure relate generally to storage of galley carts and more particularly to a rotatable placard plate retractably positioned to indicate a missing half size cart in an interior galley storage location.

Background

Galley carts are employed in commercial aircraft for food and beverage service during flights. Galley carts are typically available in a full size cart having a defined height, width and depth or a half size cart having substantially the same height and width as the full size cart but half the depth. For storage during takeoff, landing or turbulent flight conditions, the aircraft galley has one or more bays, typically under a galley work counter, each having a height to receive the carts and a width wide enough to receive two or more carts. The galley may employ two or more bays with differing cart capacity. To assure that proper cart storage is achieved placards identifying the capacity, number or weight of the complement of galley carts to be stored in the bay are employed. The placards are visible when the bay is not filled with the full complement of carts. For bays with a width for three or more carts, placards mounted on the walls of the bay may be obscured by carts loaded against the wall. The interior cart locations (not located adjacent a bay wall) may therefore not have visible placarding.

SUMMARY

Exemplary embodiments provide a retractable placard system for galley cart storage bays which employs an outer plate mounted with a hinge to a surface of a cart storage bay. The outer plate is adapted to depend substantially vertically from the surface in a first position and to rotate in a first direction upon contact by a first edge of a half size cart. A placard is mounted to the outer plate and is visible in the bay with the outer plate in the first position and retracted with the outer plate rotated in the first direction to a second position.

The embodiments provide a method for displaying and retracting a placard in a galley cart storage bay by suspending an outer rotatable plate carrying a placard in a first position from an upper surface over a central storage position. The outer rotatable plate is then rotated in a first direction responsive to contact by a first edge of a galley cart allowing insertion of the cart under the rotated plate.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments herein provide a means for placarding galley cart bays which is identifiable for all partial loading conditions of the bay. More specifically, the embodiments described herein provide a placard system for a central cart positions in a galley bay which is retractable to allow insertion or removal of either fully size or half size carts but remains in an extended position if no cart or a single half cart is inserted in the position. A rotatable plate supports a placard indicative of the galley capacity, number or weight of galley cart storage within an aircraft galley compartment and provides visibility to the cabin flight crew until final cart placement within the compartment. In function the placard is mechanically placed in a position visible to the cabin flight crew such that when a galley cart storage bay position which is not adjacent a wall of the bay is empty or contains a half size cart the placard remains visible. At the insertion of the final capacity galley cart the placard mechanical retracts from obstructing the cart placement within the storage area and from view of the cabin flight crew.

Figure 1A:
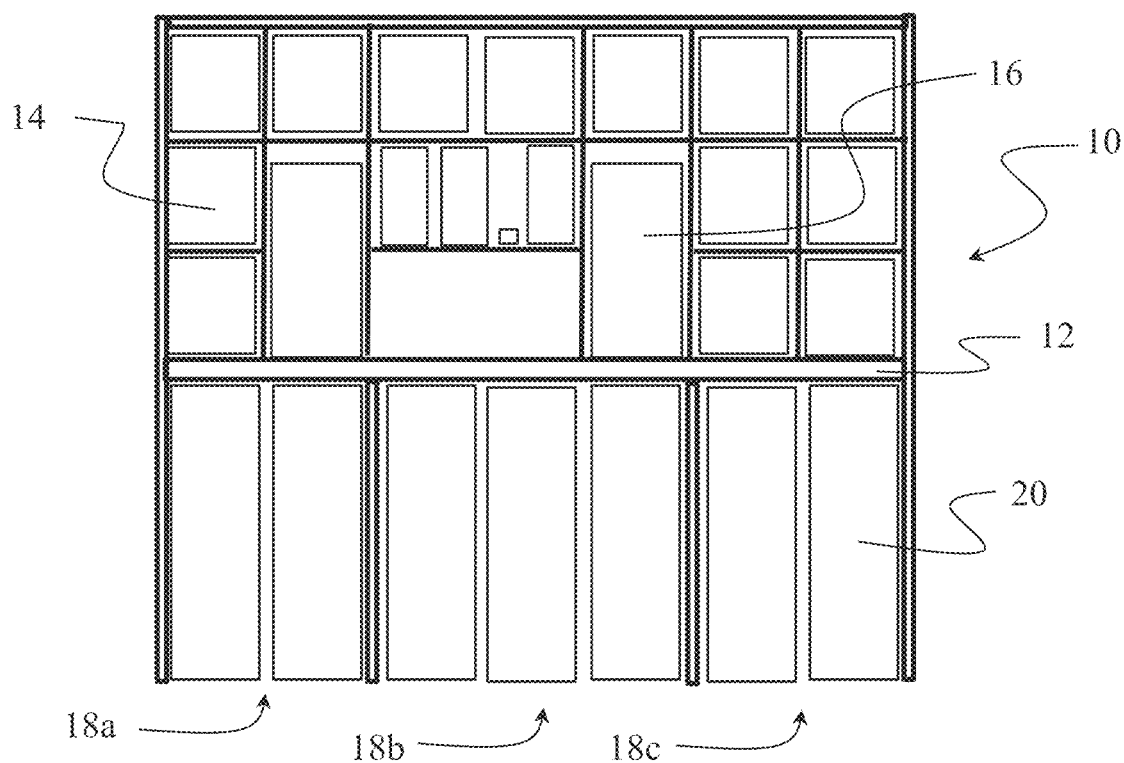
FIG. 1A is an exemplary galley layout providing storage bays for 7 galley cart widths.
Figure 1B:
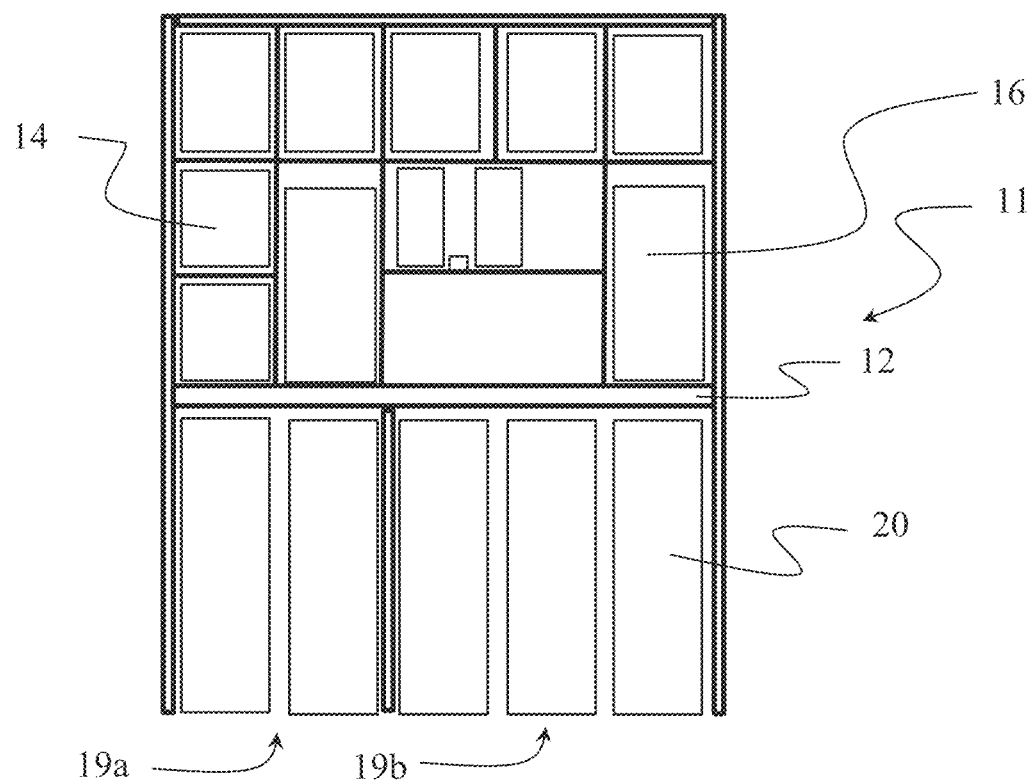
FIG. 1B is an exemplary galley layout providing storage bays for 5 galley cart widths.

Referring to the drawings, FIG. 1A shows an exemplary configuration for a galley 10 having a work counter 12, wall bins 14, coffee makers 16 and three storage bays 18a, 18b and 18c for galley carts 20. Storage bays 18a and 18c are configured with a two cart width while storage bay 18b is configured with a three cart width allowing storage of seven full size carts or up to 14 half size carts with any mixture of full and half size carts desired. FIG. 1B shows a second exemplary configuration for a galley 11 with two storage bays 19a and 19b of two and three cart widths respectively for storage of 5 full size carts 20 or up to 10 half size carts 21. Alternative embodiments with bays of up to four cart widths may be employed and galleys employing only a single bay of three or four cart widths are also common.

Figures 2A, 2B:
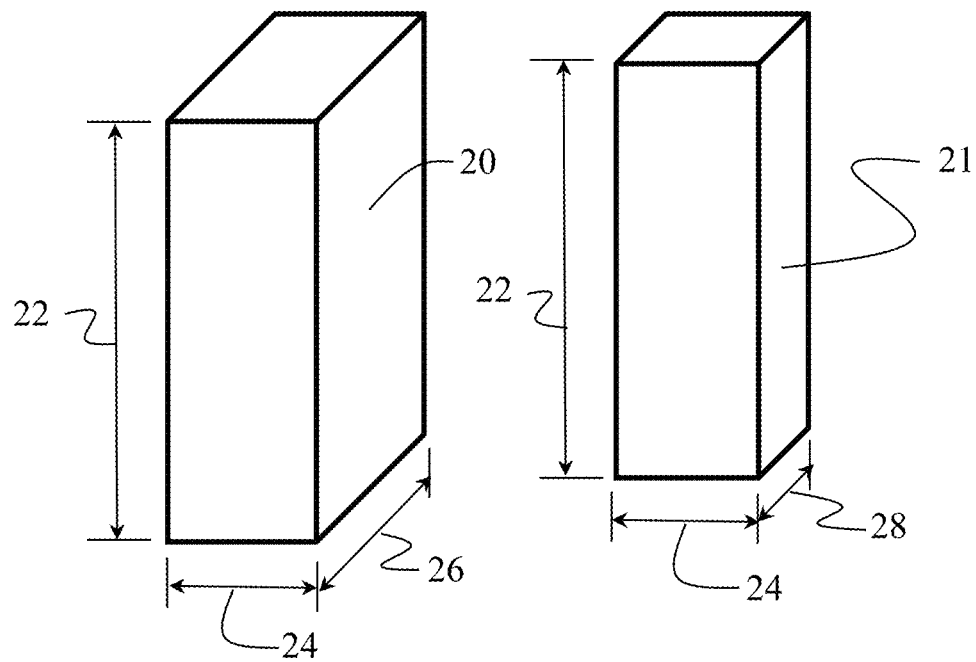
FIG. 2A is a representation of a full size galley cart.
FIG. 2B is a representation of a half size galley cart.
Figure 3:
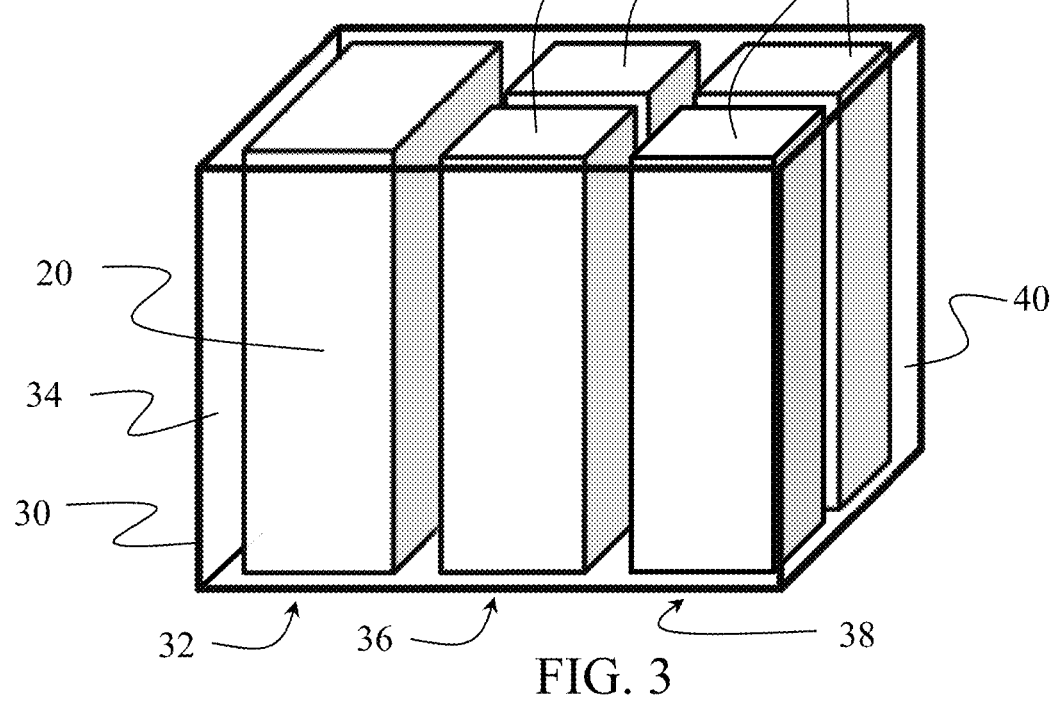
FIG. 3 is a representation of a storage configuration of combined full size and half size carts in a three cart width galley bay.

FIG. 2A is a representation of a full size cart 20 having a height 22, width 24 and depth 26. FIG. 2B is a representation of a half size cart 21 showing a common height 22 and width 24 with the full size cart but a half depth 28 (wheels of the carts have not been shown for simplicity). FIG. 3 shows an exemplary three cart width bay 30 in which a full size cart 20 is stored in a left storage position 32 adjacent a left wall 34, two half size carts 21a and 21b are stored in central storage position 36 and two half size carts 21c and 21d are stored in a right storage position 38 adjacent a right wall 40 of the bay 30.

Figure 4A:
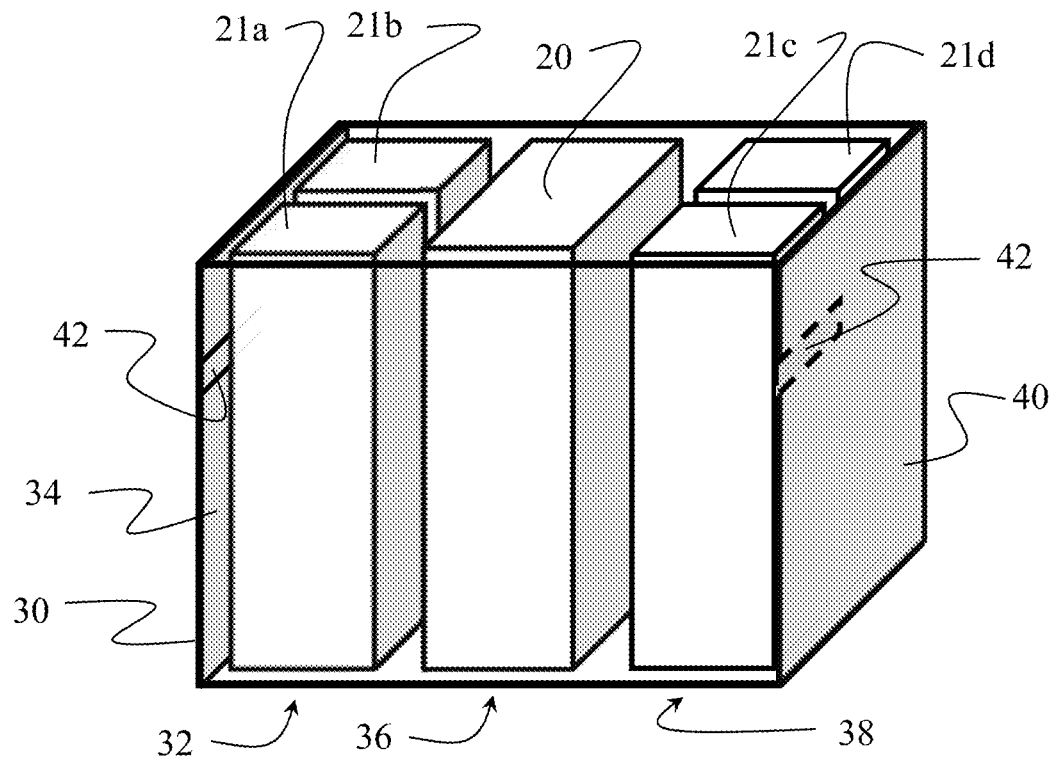
FIG. 4A is a representation of the three cart width bay in a first fully loaded configuration.
Figure 4B:
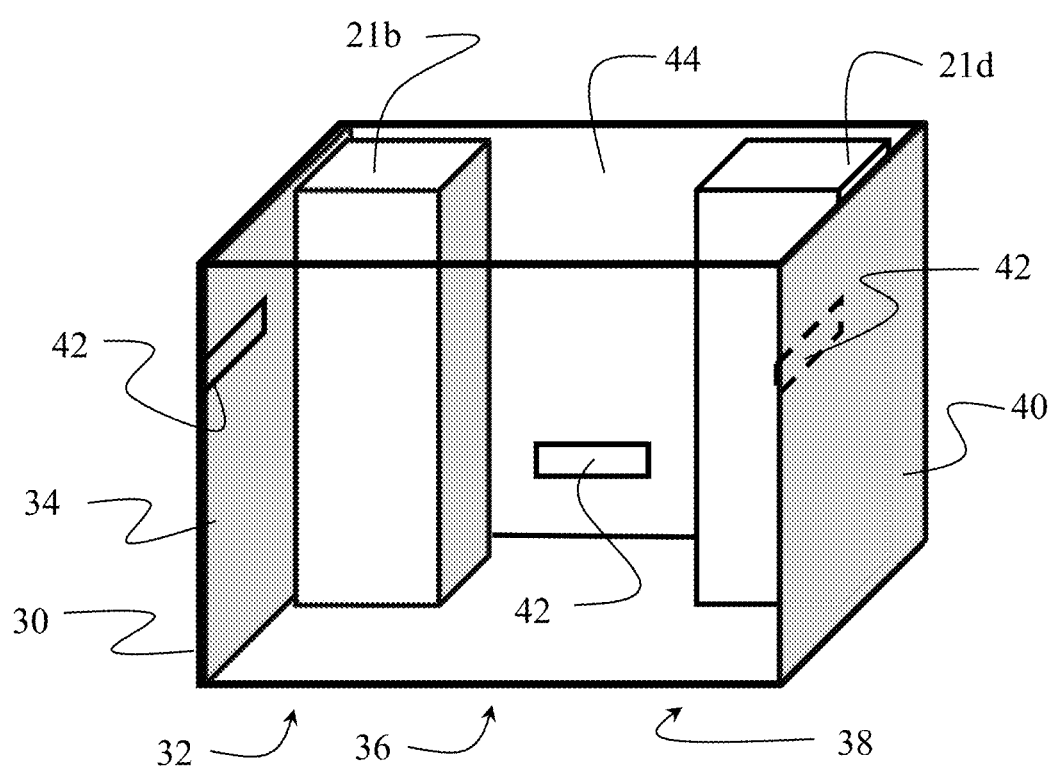
FIG. 4B is a representation of the three cart width bay of FIG. 4A in a partially loaded configuration.
Figure 5A:
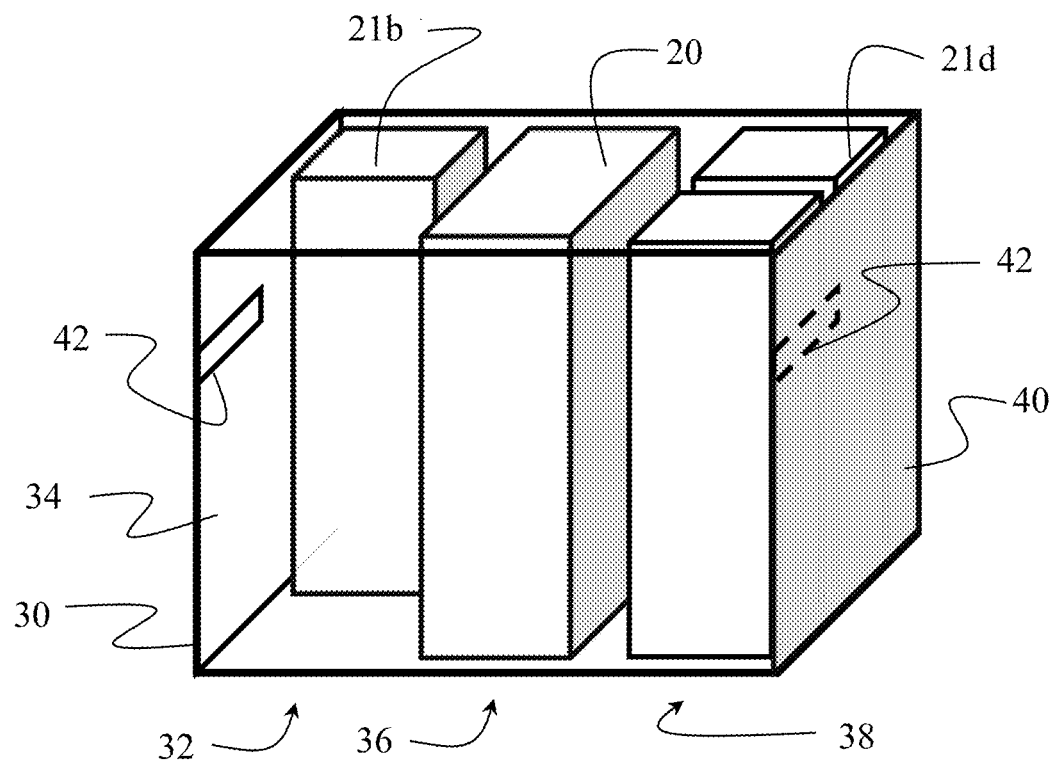
FIG. 5A is a representation of the three cart width bay in a second partially loaded configuration.
Figure 5B:
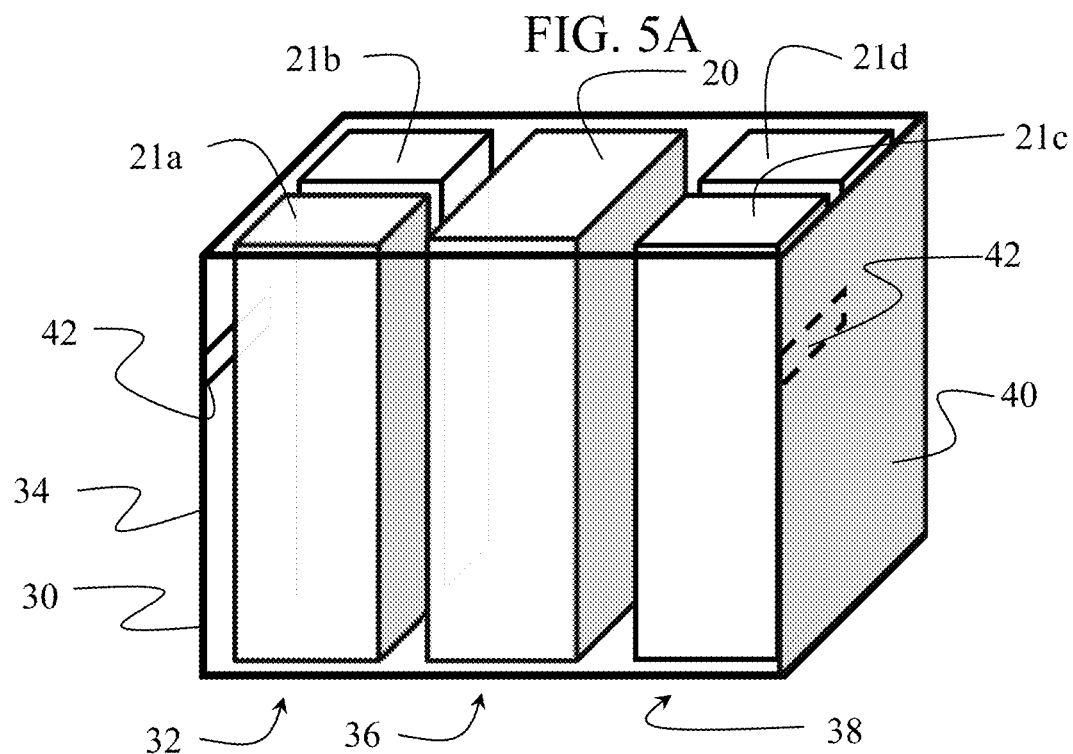
FIG. 5B is a representation of the three cart width bay of FIG. 5A in a fully loaded configuration.

FIG. 4A shows the bay 30 fully loaded with half size carts 21a and 21b in the left storage position 32, a full size cart 20 in the central storage position 36 and two half size carts 21c and 21d in the right storage position 38. With the full size cart 20 removed from the central storage position 36 and the outer half size carts 21a and 21c removed from the left and right storage positions 32, 38, respectively, as seen in FIG. 4B for a first partially filled condition of the bay, placards 42 placed on the left wall 34, right wall 40, and rear wall 44 are visible indicating that carts are missing from the bay. As seen in FIG. 5A for a second partially filled condition of the bay, if the full size cart 20 is reloaded in the central storage position 36 and the half size cart 21c is reloaded in the right storage position 38, the placards on the rear wall 44 and right wall 40 are covered. However, this is acceptable since both the central storage position and right storage position are full. The empty half cart position in the left storage area is still indicated by the visible placard 42 on the left wall 34. Loading of the half size cart 21a into the left storage position obscures the placard on the left wall but, again, the position is full and this is an acceptable condition. If either the right storage position or the left storage position were occupied by a full size cart the placards on the walls would be obscured. However, this is also an acceptable condition since the storage position would be full.

Figure 6A:
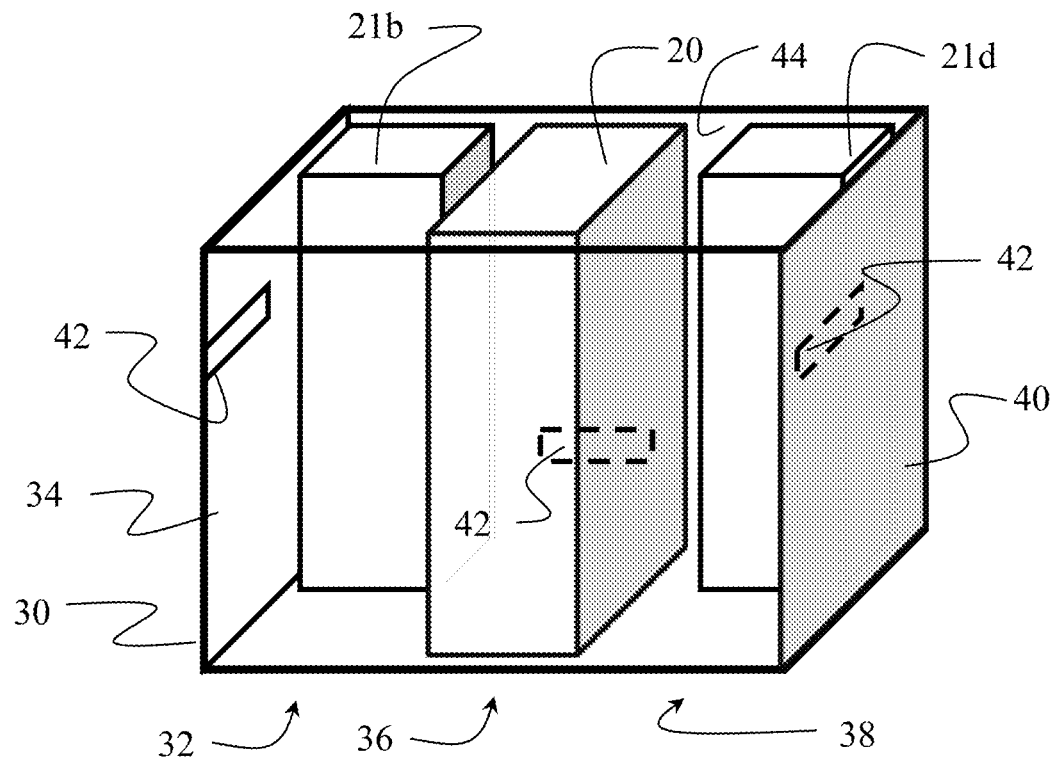
FIG. 6A is a representation of the three cart width bay in a third partially loaded configuration.
Figure 6B:
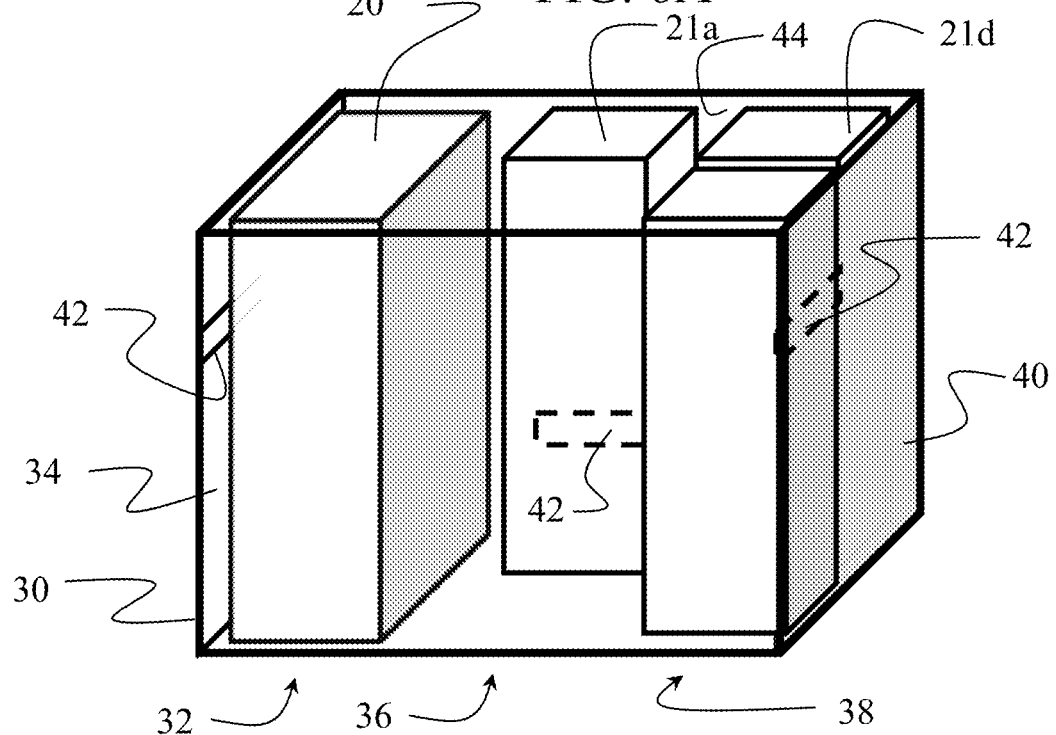
FIG. 6B is a representation of the three cart width bay in a fourth partially loaded configuration.

As seen in FIG. 6A for a third partially filled configuration, the central storage location is filled with a full size cart 20 obscuring the placard on the rear wall 44. This is acceptable since that position is full. The right and left storage positions each contain a half size cart 21b and 21d. The placards on the left wall 34 and right wall 40 are visible so this is an acceptable condition. In FIG. 6B for a fourth partially filled configuration loading of a full size cart 20 in the left storage position and two half size carts 21c and 21d in the right storage position obscures the placards on the left and right walls 34 and 40 respectively, which is acceptable since those positions are filled. However, loading of one half size cart 21a in the central storage position obscures the placard on the rear wall 44 while an unfilled portion of the central storage position is present. This prevents viewing of any placard by the crew however the bay is not yet completely filled. This is not an acceptable condition.

Figure 7:
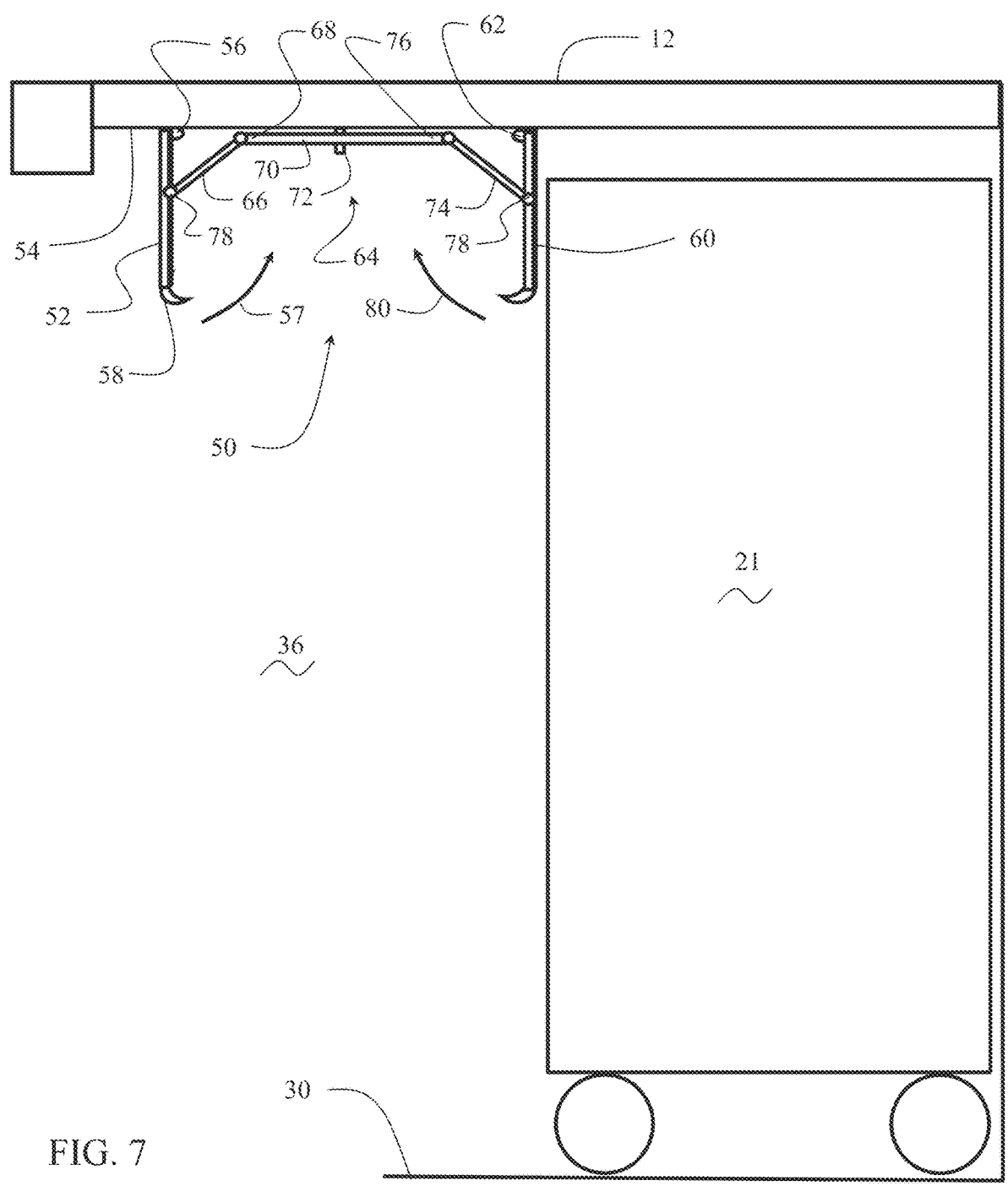
FIG. 7 is a side view of an exemplary embodiment of the rotatable placard plate assembly.
Figure 8:
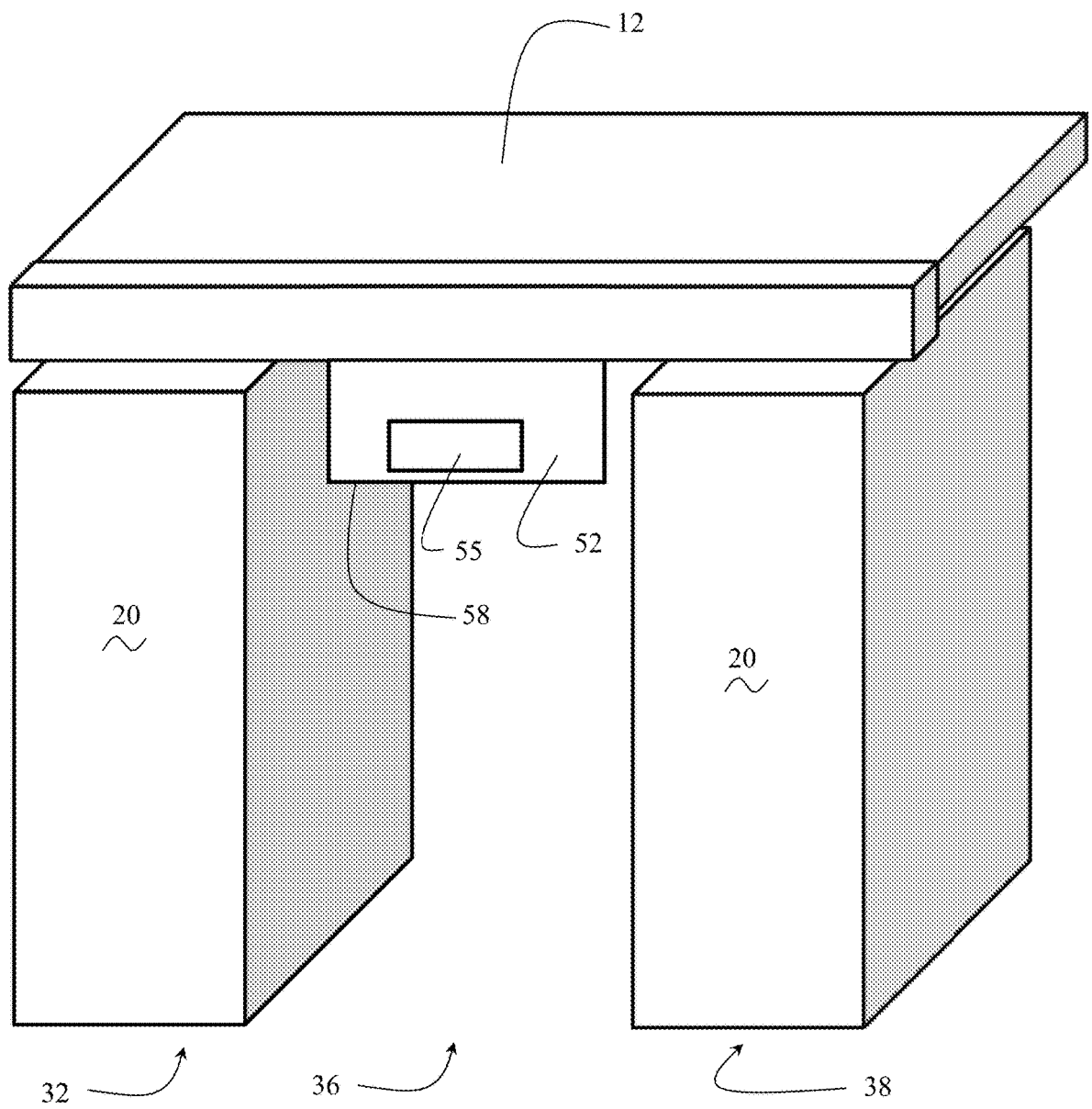
FIG. 8 is a pictorial representation of the exemplary embodiment.

An exemplary embodiment of the retractable placard system which remedies this condition is shown in FIG. 7. The bay 30 under work counter 12 is shown with one half size cart 21 for reference. The retractable placard system 50 employs an outer plate 52 which is attached to an upper surface 54 of the bay 30, which for the embodiment shown is a lower surface of the work counter 12 in the galley. With the central storage position 36 in the bay 30 empty or with one half size cart loaded, the outer plate 52 depends substantially vertically downward in the central storage position and a placard 55 is displayed on the outer plate as seen in FIG. 8. The outer plate 52 is mounted to the surface 54 with a hinge 56 allowing the outer plate to rotate in a first direction represented by arrow 57 in FIG. 7 for insertion of a cart into the central storage position 36. If a half size cart is inserted, upon passing beyond the retractable placard system 50, the outer plate 52 rotates down into position displaying the placard. Upon insertion of a second half size cart or a full size cart filling the central storage position, as will be described with respect to FIG. 11 subsequently, a lower edge 58 of the outer plate 52 rests on a top surface of the cart and remains in a retracted position with the placard hidden from view.

Returning to FIG. 7, to facilitate easy removal of a half size cart 21 from the rear space in the central storage position 36, an inner plate 60 is mounted to the surface 54 in the bay 30 with a hinge 62 as a cart removal sensor. The outer plate 52 and inner plate 60 are connected with a linkage 64. A first compression/tension arm 66 attached to the outer plate 52 extends to a first end 68 of a rotating arm 70. The rotating arm 70 is mounted to the surface 54 with a pivot 72. A second compression/tension arm 74 attached to the inner plate 60 extends to a second end 76 of the rotating arm 70. Connection of the compression/tension arms 66 and 74 to the outer and inner plates 52 and 60 and the rotating arm 70 is accomplished with universal joints 78. Withdrawing the half size cart 21 from the rear position contacts the inner plate as the sensor and causes the inner plate 60 to rotate in a second direction, represented by arrow 80, which is transmitted through the linkage 64 to rotate the outer plate in the first direction 57 as will be described in greater detail subsequently. While described herein as a rotating mechanical linkage, in alternative embodiments the cart removal sensor may employ electrical or optical sensing of position of a cart and the linkage may comprise an electromechanical rotation mechanism responsive to the sensor for rotating the outer plate 52. The cart removal sensor is any suitable sensor that detects proximity of the half size cart being removed from the cart storage bay.

Figure 9A:
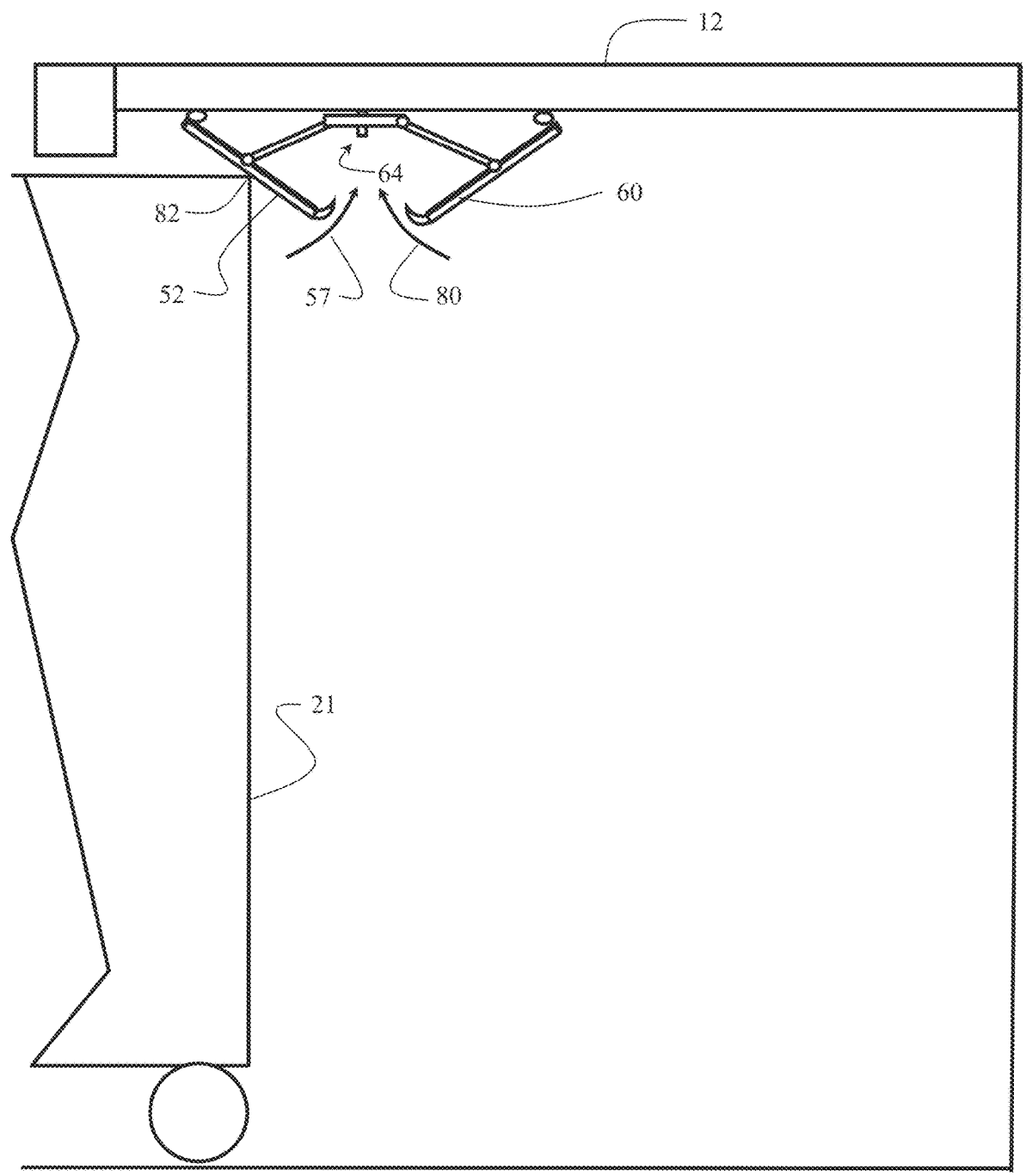
FIG. 9A is a side view of the exemplary embodiment demonstrating commencement of retraction during the initial stage of insertion of a cart.
Figure 9B:
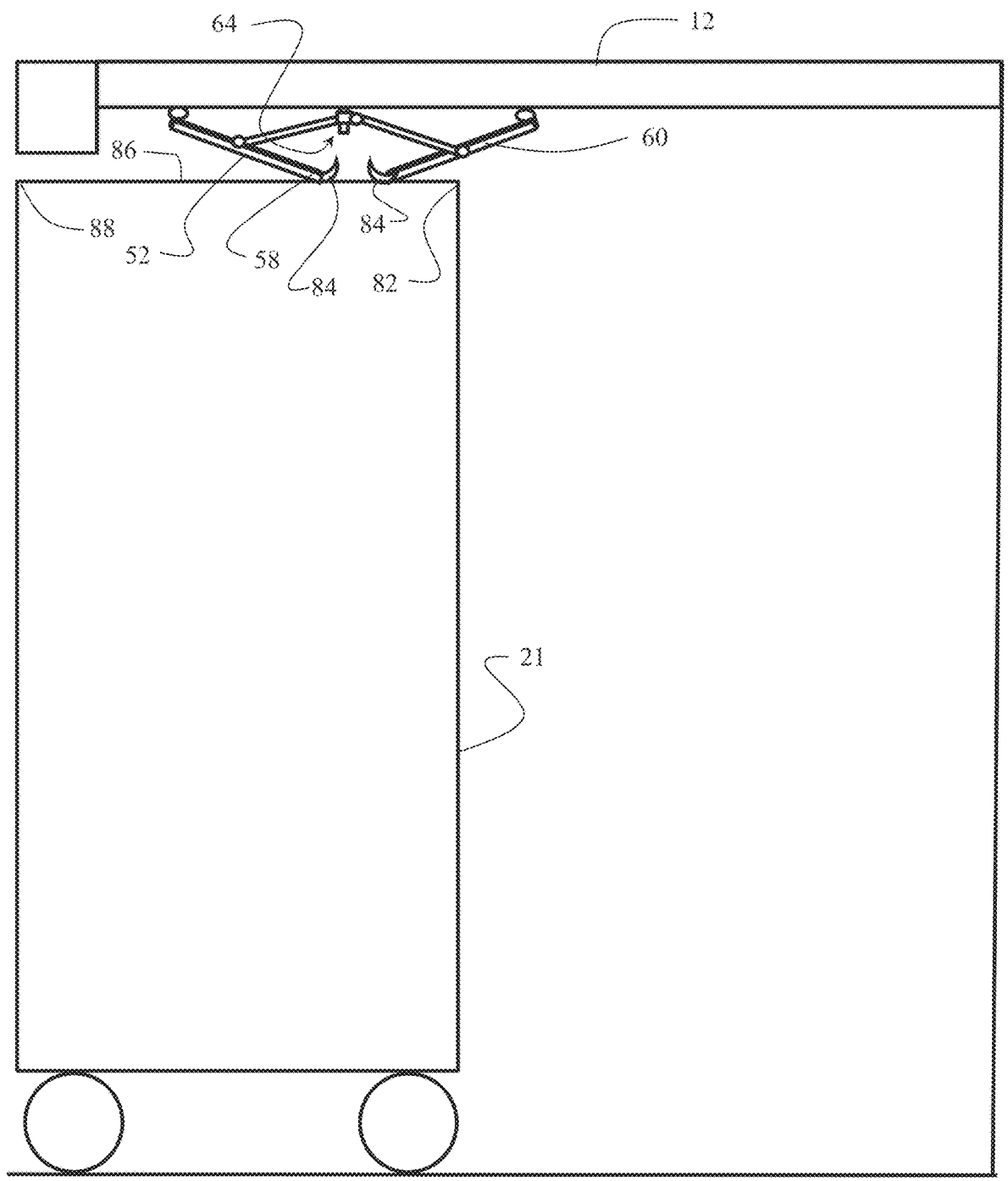
FIG. 9B is a side view of the exemplary embodiment during the fully retracted stage during of insertion of a cart.

For insertion of a half size cart 21, as seen in FIG. 9A an inner upper edge 82 of the cart 21 contacts the outer plate 52 causing the outer plate 52 to rotate in the first direction 57. The linkage 64 causes a complimentary rotation by the inner plate 60 in the second direction 80. As seen in FIG. 9B, when the outer plate 52 has rotated sufficiently for the cart 21 to pass under the plate, the inner plate 60 has been rotated sufficiently for the cart 21 to pass. Both the outer plate 52 and inner plate 60 have a curved foot 84 on the lower edge 58 to accommodate sliding interaction with a top surface 86 of the cart 21. The cart 21 may be pushed to the rear of the central storage position 36 and as an outer upper edge 88 of the cart 21 clears the foot 84 of the inner plate 60, both the inner plate 60 and outer plate 52 will rotate downwardly to the initial position shown in FIG. 7. Weight of the inner and outer plates 60, 52 may be employed to cause the downward rotation by gravity. However, spring assists in the linkage to urge the plates positively in a downward direction may be used.

Figure 10A:
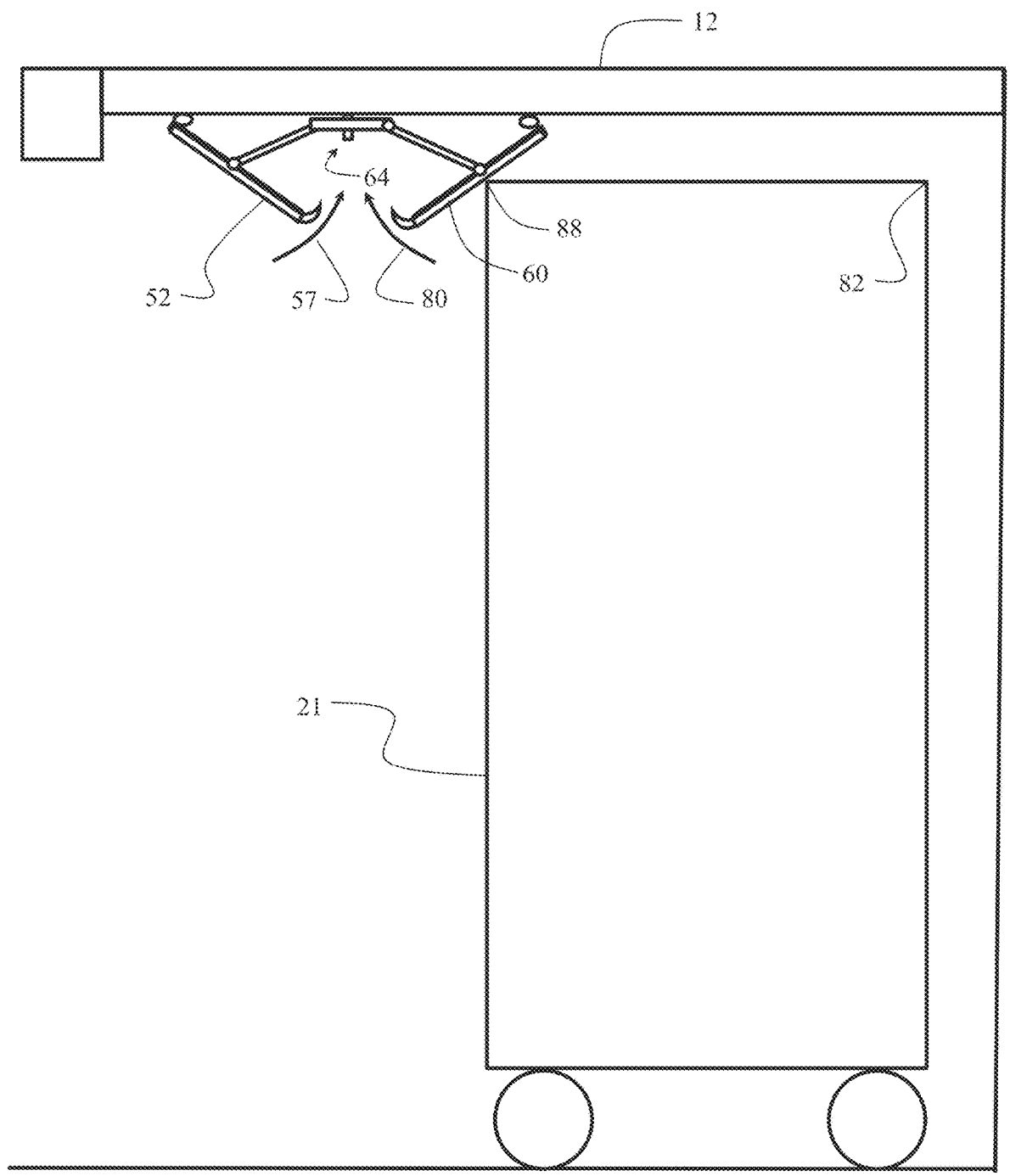
FIG. 10A is a side view of the exemplary embodiment demonstrating commencement of retraction during the initial stage of withdrawal of a half size cart from a rear position.
Figure 10B:
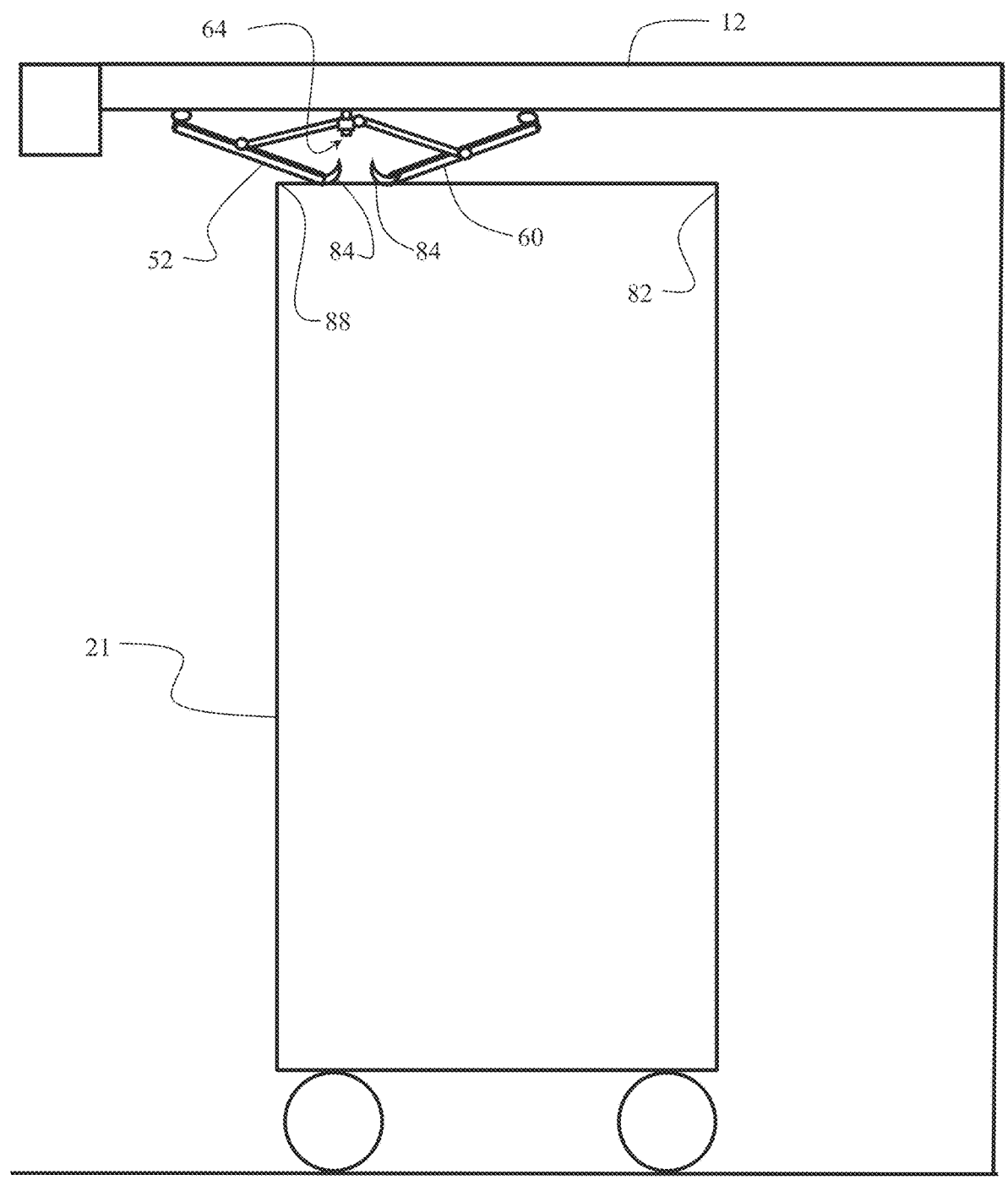
FIG. 10B is a side view of the exemplary embodiment during the fully retracted stage during of withdrawal of the half size cart.

For removal of the half size cart 21 from the rear of the central storage position 36, as seen in FIG. 10A the outer upper edge 88 of the cart 21 contacts the inner plate 60 as the removal sensor detecting the proximity of the cart 21 for removal and causes the inner plate 60 to rotate in the second direction 80. The linkage 64 causes a complimentary rotation by the outer plate 52 in the first direction 57. As seen in FIG. 10B, when the inner plate 60 has rotated sufficiently for the cart 21 to pass under the inner plate 60, the outer plate 52 has been rotated sufficiently for the cart 21 to pass. As the inner upper edge 82 of the cart 21 clears the foot 84 of the outer plate 52, both the inner plate 60 and outer plate 52 will rotate downwardly to the initial position shown in FIG. 7.

Figure 11:
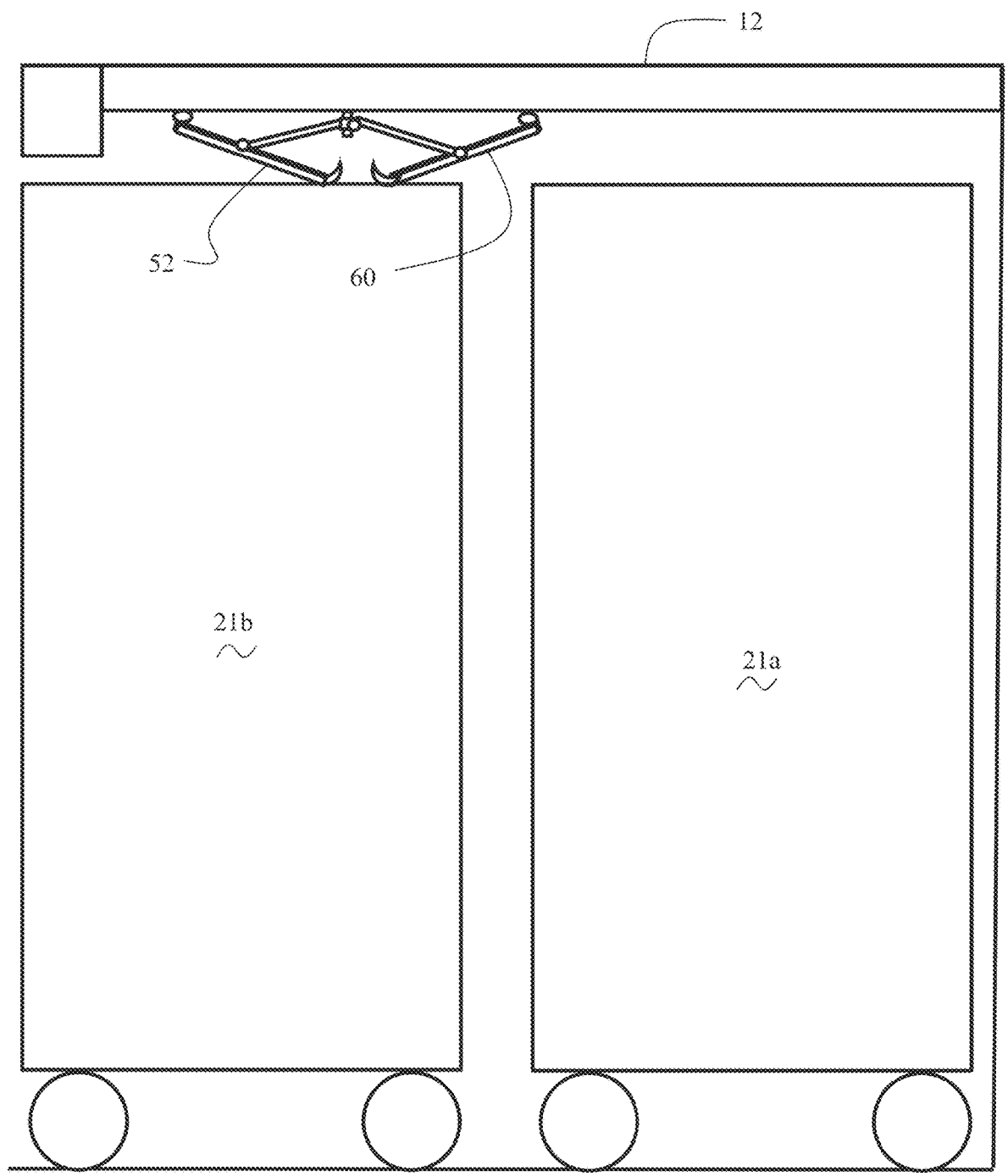
FIG. 11. Is aside view of the exemplary embodiment with two carts inserted.

With a first cart 21a installed in the central storage position 36 of the bay 30, a second cart 21b may be installed with a process rotating the outer and inner plates 52, 60 similar to that described with respect to FIGS. A and 9B. As shown in FIG. 11 the rotated outer plate 52 and inner plate 60 will be maintained in the rotated position by the presence of the second cart 21b thereby maintaining the retracted position of the placard 55 attached to the outer plate 52.

Figure 12A:
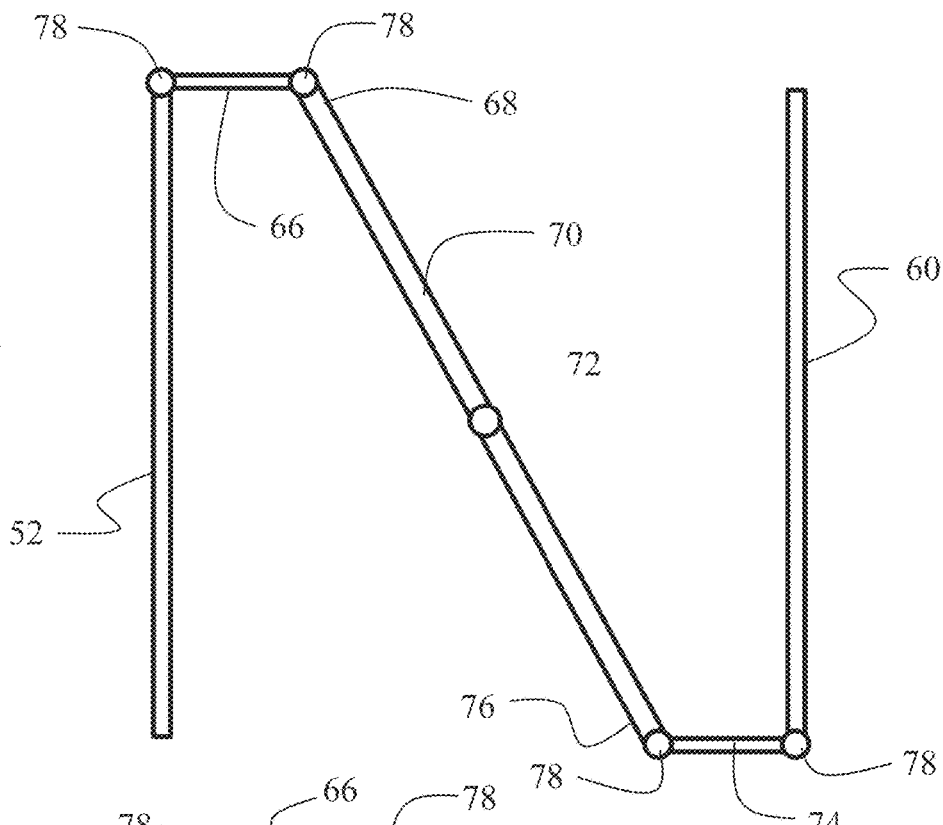
FIG. 12A is a top view of the actuation mechanism of the rotatable placard plate assembly in the unrotated position corresponding to FIG. 8.
Figure 12B:
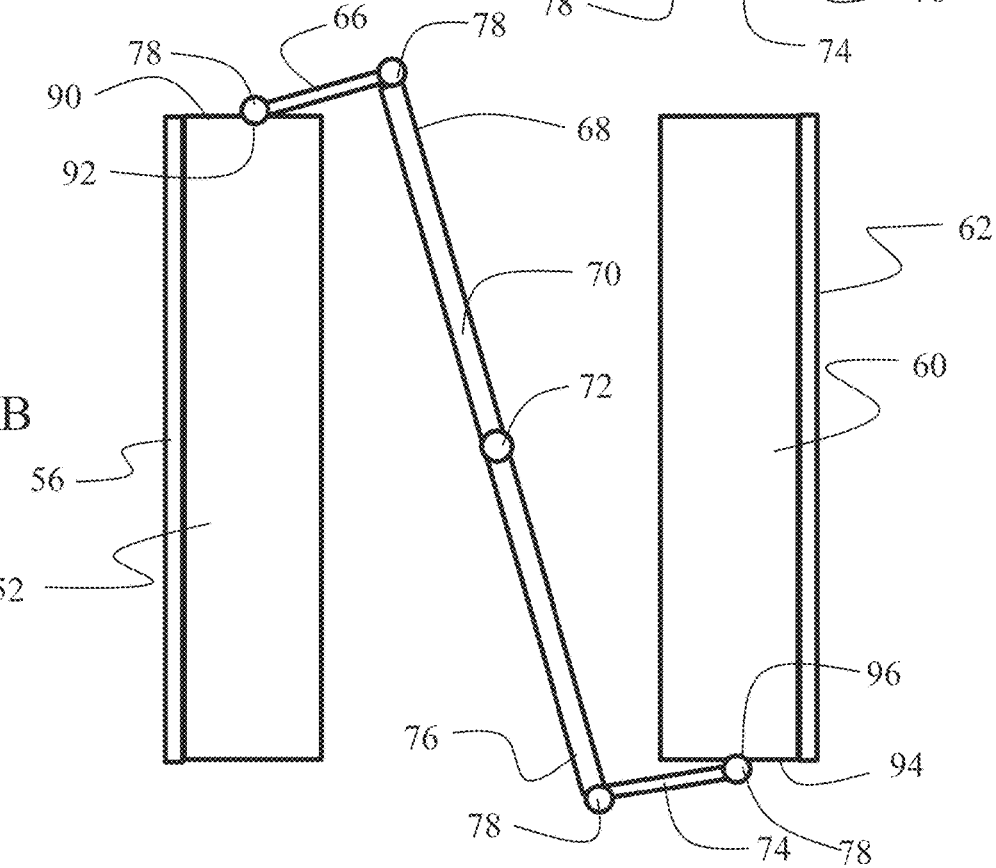
FIG. 12B is a top view of the actuation mechanism of the rotatable placard plate assembly in the partially rotated position corresponding to FIG. 9.
Figure 12C:
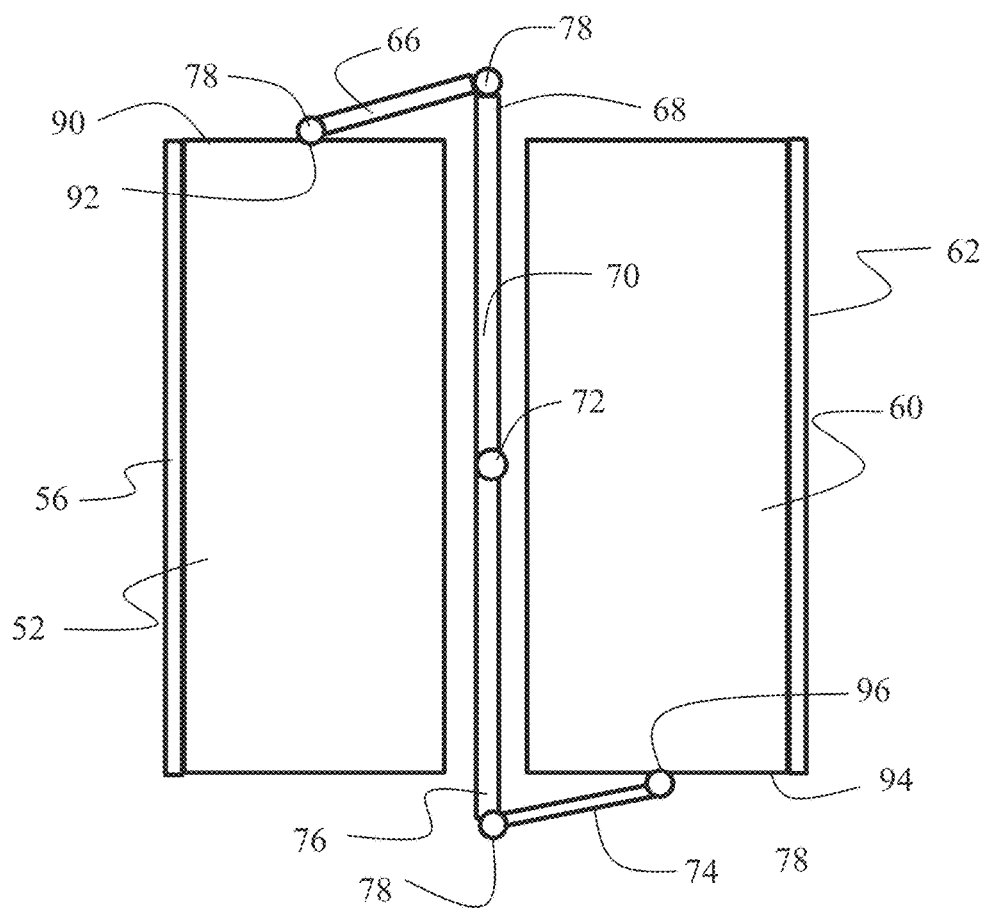
FIG. 12C is a top view of the actuation mechanism of the rotatable placard plate assembly in the fully rotated position corresponding to FIG. 10 or 11; and, FIG. 13 is a flow chart demonstrating a method for employing the embodiments disclosed herein.

Operation of the linkage 64 to obtain complimentary rotation of the outer plate 52 and inner plate 60 is seen in FIGS. 12A-12C. For the embodiment shown in the drawings, the compression/tension arm 66 is attached with universal joint 78 to an edge 90 of the outer plate 52, substantially perpendicular to the hinge 56 (as seen in FIG. 7), at approximately a midpoint 92 as best seen in FIGS. 12B and 12C. Similarly, Compression/tension arm 74 is attached to an edge 94 of the inner plate 60 with a universal joint 78 at approximately a midpoint 96. The extended or unrotated position of the inner and outer plates 52, 60 is shown in FIG. 12A corresponding to the position shown in FIGS. 7 and 8. Upon contact by a cart 20 or 21 with either the outer plate 52 or inner plate 60, rotation of the plate 52 or 60 causes compression of the respective arm 66 or 74 which is transmitted to the rotating arm 70 causing rotation about the pivot 72. The rotating arm 70 then causes tension in the opposite arm 74 or 66 inducing complimentary rotation of the inner plate 60 or outer plate 52. The partially rotated position corresponding to FIGS. 9A and 10A is shown in FIG. 12B while the fully rotated position of FIGS. 9B, 10B and 11 is shown in FIG. 12C.

Figure 13:
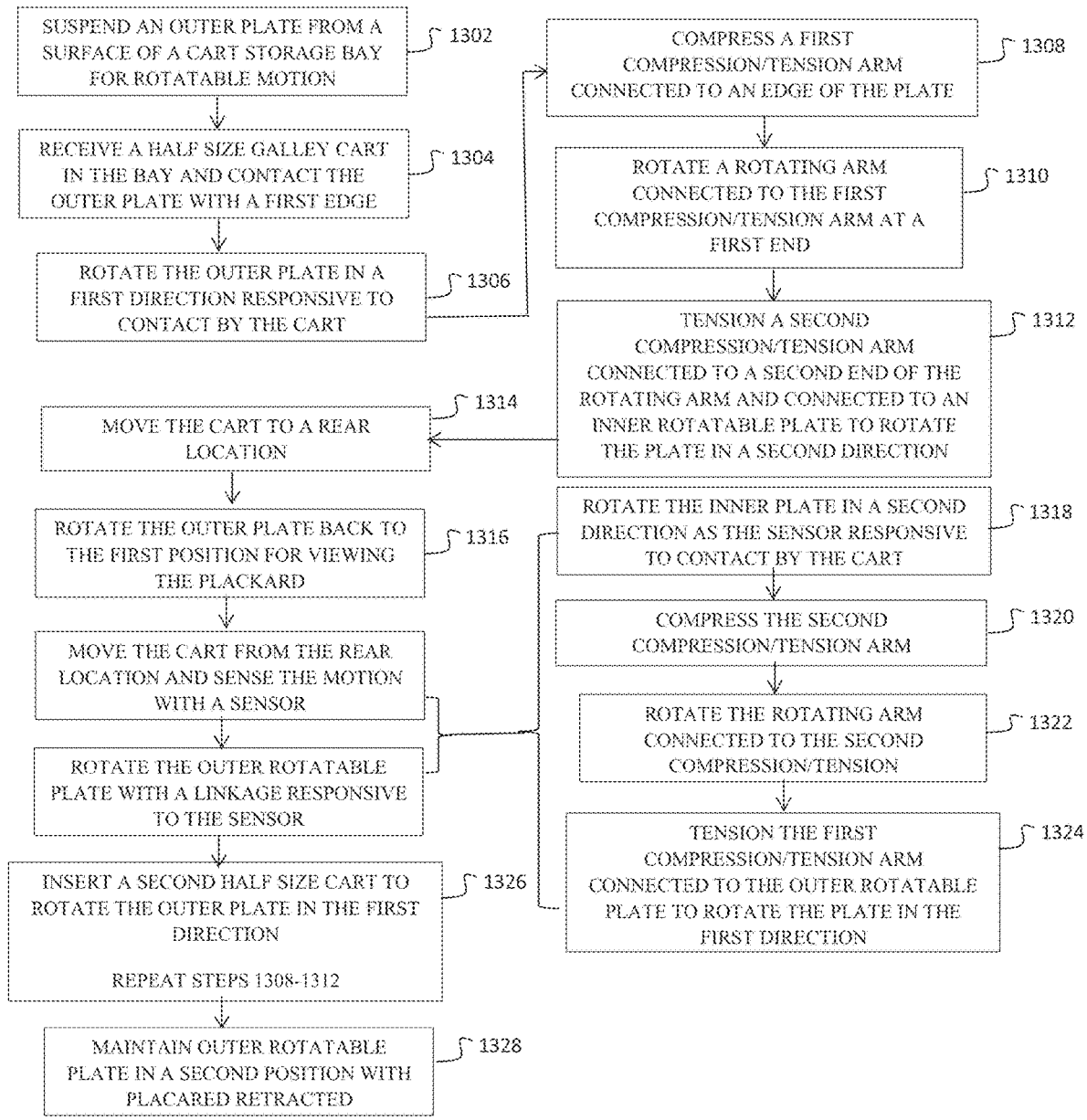

As seen in FIG. 13, the embodiment disclosed herein may be constructed to provide a retractable placard system 50 by rotatably suspending an outer plate 52 from a surface 54 of a cart storage bay, step 1302. Receiving a half size galley cart 21 in the bay 30 and contacting the outer plate 52 with a first edge 82 of the cart 21, step 1304. Rotating the outer plate 52 in a first direction 57 responsive to contact with the first edge 82 to allow insertion of the galley cart 21, step 1306. In the exemplary embodiment, the rotation of the outer plate 52 compresses a first compression/tension arm 66 connected to an edge 90 of the outer plate 52, step 1308. A rotating arm 70 connected at a first end 68 to the first compression/tension arm 66 and mounted to a pivot 72 on the surface 54 of the bay 30 is rotated, step 1310, placing tension on a second compression/tension arm 74 connected to a second end 76 of the rotating arm 70 and further connected to an edge 94 of the inner plate 60 to rotate the inner plate 60 in a second direction 80, step 1312. The cart 21 is then moved to a rear location in the central storage position 36, step 1314, and the outer plate 52 is rotated back to the first position for viewing of the placard 55, step 1316.

For removal of the cart 21, the half size cart 21 is moved from the rear location and proximity of the galley cart 21 is sensed with a sensor, step 1318, which for the embodiments disclosed is accomplished by contacting a second edge 88 of the cart 21 with the inner plate 60 to rotate in the second direction 80. The outer plate 52 is then rotated in the first direction 57 with a linkage 64 responsive to the sensor, which for the embodiment disclosed is accomplished by compressing the second compression/tension arm 74, step 1320. The rotating arm 70 is rotated, step, 1322 and tension is exerted on the first compression/tension arm 66 to rotate the outer plate 52 in the first direction 57, step 1324, allowing removal of the galley cart 21 under the rotated plates 52, 60.

When a second half size cart 21b is inserted into the central storage position 36, the outer plate 52 is rotated in the first direction 57 responsive to contact by a first edge 82 of the second galley cart 21b allowing insertion of the second galley cart 21b under the rotated outer plate 52, step 1326. Steps 1308 to 1312 are accomplished in the exemplary embodiments to also rotate the inner plate 60 for clearance of the second galley cart 21b. The inner plate 60 is maintained in a second position with the placard 55 retracted from view, step 1328, with both carts 21a, 21b inserted in the central storage position 36.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A retractable placard system comprising:
an outer plate mounted with a hinge to a surface of a cart storage bay, said outer plate extending downward vertically from the surface in a first position and rotated in a first direction upon contact by a first edge of a half size cart;
a placard mounted to said outer plate, said placard visible in the cart storage bay with the outer plate in the first position and retracted with the outer plate rotated in the first direction to a second position;
a sensor detecting proximity of the half size cart being removed from the cart storage bay, said sensor comprising an inner plate mounted with a second hinge to the surface of the cart storage bay, said inner plate extending downward vertically from the surface with the outer plate in the first position and rotated in a second direction upon contact by a second edge of the half size cart;
a linkage responsive to the sensor, said linkage comprising
a first compression/tension arm connected to an edge of the outer plate;
a rotating arm connected at a first end to the first compression/tension arm and mounted to a pivot on the surface of the cart storage bay; and,
a second compression/tension arm connected to an edge of the inner plate and further connected to a second end of the rotating arm.

2. The retractable placard system as defined in claim 1 wherein:
the first compression/tension arm is connected to the edge of the outer plate with a first universal joint,
the rotating arm is connected to the first compression/tension arm with a second universal joint;

the rotating arm is connected to the second compression/tension arm with a third universal joint; and, the second compression/tension arm is connected to the edge of the inner plate with fourth universal joint.

3. An aircraft galley comprising:
a cart storage bay having a top surface, a left wall, a right wall and a rear wall and having a left storage position adjacent the left wall, a right storage position adjacent the right wall and a central storage position intermediate the left and right storage positions, each of the left, right, and central storage positions adapted to accommodate one full size galley cart or two half size galley carts;
an outer plate mounted with a hinge to the top surface of the cart storage bay, said outer plate adapted to depend substantially vertically in a first position from the top surface in the central storage position and to rotate in a first direction upon contact by a first edge of a half size cart;
a placard mounted to said outer plate, said placard visible in the central storage position with the outer plate in the first position and retracted with the outer plate rotated in the first direction to a second position;
a sensor detecting proximity of the half size cart being removed from the cart storage bay wherein the sensor comprises an inner plate mounted with a hinge to the surface of the cart storage bay, said inner plate adapted to extend downward substantially vertically from the surface in the first position and to rotate in a second direction upon contact by a second edge of the half size cart;
a linkage responsive to the sensor for rotating the outer plate from the first position in the first direction to the second position wherein the linkage comprises:
a first compression/tension arm connected to an edge of the outer plate;
a rotating arm connected at a first end to the first compression/tension arm and mounted to a pivot on the surface of the cart storage bay; and,
a second compression/tension arm connected to an edge of the inner plate and further connected to a second end of the rotating arm.

4. The aircraft galley as defined in claim 3 wherein:
the first compression/tension arm is connected to the edge of the outer plate with a first universal joint,
the rotating arm is connected to the first compression/tension arm with a second universal joint;
the rotating arm is connected to the second compression/tension arm with a third universal joint; and,
the second compression/tension arm is connected to the edge of the inner plate with fourth universal joint.

5. A method for displaying and retracting a placard in a cart storage bay comprising:
suspending an outer rotatable plate carrying the placard, said outer rotatable plate mounted with a hinge to an upper surface of the cart storage bay, said outer plate extending downward substantially vertically from the surface in a first position over a central storage position, the placard mounted to said outer plate, said placard visible in the cart storage bay with the outer plate in the first position and retracted with the outer plate rotated in a first direction to a second position; and,
rotating the outer rotatable plate in the first direction upon contact by a first edge of a galley cart, with a linkage responsive to contact by a first edge of a galley cart allowing insertion of the galley cart under the rotated plate, a sensor detecting proximity of a half size cart being removed from the cart storage bay, said sensor comprising an inner plate mounted with a second hinge to the surface of the cart storage bay, said inner plate extending downward substantially vertically from the surface with the outer plate in the first position and rotated in a second direction upon contact by a second edge of the half size cart, the linkage comprising
a first compression/tension arm connected to an edge of the outer plate;
a rotating arm connected at a first end to the first compression/tension arm and mounted to a pivot on the surface of the cart storage bay; and,
a second compression/tension arm connected to an edge of the inner plate and further connected to a second end of the rotating arm.

6. The method for displaying and retracting a placard in a cart storage bay as defined in claim 5 wherein the galley cart is a half size cart and further comprising:
moving the half size cart to a rear location in the central storage position; and,
rotating the outer rotatable plate back to the first position for viewing of the placard.

7. The method for displaying and retracting a placard in a cart storage bay as defined in claim 6 further comprising:
moving the half size cart from the rear location;
sensing motion of the galley cart with the sensor; and,
rotating the rotatable plate in the first direction with the linkage responsive to the sensor allowing removal of the galley cart under the rotated plate.

8. The method for displaying and retracting a placard in a cart storage bay as defined in claim 6 further comprising:
rotating the rotatable plate in the first direction responsive to contact by a first edge of a second half cart allowing insertion of the second half size cart under the rotated plate; and
maintaining the rotatable plate in a second position with the placard retracted from view.

9. The method for displaying and retracting a placard in a cart storage bay as defined in claim 7 wherein the step of sensing motion comprises:
suspending the inner rotatable plate in a first position from the upper surface over the central storage position as the sensor; and,
rotating the inner rotatable plate in the second direction responsive to contact by the second edge of the half size cart; and
rotating the outer rotatable plate in the first direction with the linkage responsive to rotation of the inner rotatable plate allowing removal of the half size cart under the rotated plates.

10. The method for displaying and retracting a placard in a cart storage bay as defined in claim 9 wherein the step of rotating the outer rotatable plate in a first direction responsive to contact by a first edge of a half size cart further comprises:
compressing the first compression/tension arm connected to an edge of the outer rotatable plate;
rotating the rotating arm connected at the first end to the first compression/tension arm and mounted to the pivot on the upper surface of the cart storage bay; and,
exerting tension on the second compression/tension arm connected to the second end of the rotating arm and further connected to the edge of the inner rotatable plate to rotate the inner rotatable plate in the second direction.

11. The method for displaying and retracting a placard in a cart storage bay as defined in claim 10 wherein the step of rotating the outer rotatable plate in the first direction with the linkage comprises:
compressing the second compression/tension arm;
rotating the rotating arm; and,
exerting tension on the first compression/tension arm to rotate the outer rotatable plate in the first direction.

12. The method for displaying and retracting a placard in a cart storage bay as defined in claim 8 wherein the step of rotating the rotatable plate in the first direction responsive to contact by the first edge of a second galley cart further comprises:
compressing the first compression/tension arm connected to the edge of the outer rotatable plate;
rotating the rotating arm connected at the first end to the first compression/tension arm and mounted to the pivot on the surface of the cart storage bay; and,
exerting tension on the second compression/tension arm connected to the second end of the rotating arm and further connected to the edge of the inner rotatable plate to rotate the inner rotatable plate in the second direction allowing insertion of the second galley cart under both the rotated plates.

13. A method for displaying and retracting a placard in an aircraft galley comprising:
providing a cart storage bay having a top surface, a left wall, a right wall and a rear wall and having a left storage position adjacent the left wall, a right storage position adjacent the right wall and a central storage position intermediate the left and right storage positions, each of the left, right, and central storage positions adapted to accommodate one full size galley cart or two half size galley carts;
suspending an outer rotatable plate carrying the placard, said outer rotatable plate mounted with a hinge to an upper surface of the cart storage bay, said outer plate extending downward substantially vertically from the surface in a first position over a central storage position, the placard mounted to said outer plate, said placard visible in the cart storage bay with the outer plate in the first position and retracted with the outer plate rotated in a first direction to a second position; and,
rotating the outer rotatable plate in the first direction upon contact by a first edge of a galley cart, with a linkage responsive to contact by a first edge of a galley cart allowing insertion of the galley cart under the rotated plate, a sensor detecting proximity of a half size cart being removed from the cart storage bay, said sensor comprising an inner plate mounted with a second hinge to the surface of the cart storage bay, said inner plate extending downward substantially vertically from the surface with the outer plate in the first position and rotated in a second direction upon contact by a second edge of the half size cart, the linkage comprising
a first compression/tension arm connected to an edge of the outer plate;
a rotating arm connected at a first end to the first compression/tension arm and mounted to a pivot on the surface of the cart storage bay; and,
a second compression/tension arm connected to an edge of the inner plate and further connected to a second end of the rotating arm.

14. The method for displaying and retracting a placard in an aircraft galley as defined in claim 13 wherein the galley cart is a half size cart and further comprising:
moving the half size cart to a rear location in the central storage position; and,
rotating the outer rotatable plate back to the first position for viewing of the placard.

15. The method for displaying and retracting a placard in an aircraft galley as defined in claim 14 further comprising:
moving the half size cart from the rear location;
sensing motion of the galley cart with the sensor; and,
rotating the rotatable plate in the first direction with the linkage responsive to the sensor allowing removal of the galley cart under the rotated plate.

16. The method for displaying and retracting a placard in a cart storage bay as defined in claim 14 further comprising:
rotating the rotatable plate in the first direction responsive to contact by a first edge of a second half size cart allowing insertion of the second half size cart under the rotated plate; and
maintaining the rotatable plate in a second position with the placard retracted from view.

17. The method for displaying and retracting a placard in an aircraft galley as defined in claim 15 wherein the step of sensing motion comprises:
suspending the inner rotatable plate in a first position from the upper surface over the central storage position as the sensor; and,
rotating the inner rotatable plate in the second direction responsive to contact by the second edge of the half size cart; and
rotating the outer rotatable plate in the first direction with the linkage responsive to rotation of the inner rotatable plate allowing removal of the half size cart under the rotated plates.

18. The method for displaying and retracting a placard in an aircraft galley as defined in claim 17 wherein the step of rotating the outer rotatable plate in a first direction responsive to contact by a first edge of a half size cart further comprises:
compressing the first compression/tension arm connected to an edge of the outer rotatable plate;
rotating the rotating arm connected at the first end to the first compression/tension arm and mounted to the pivot on the upper surface of the cart storage bay; and,
exerting tension on the second compression/tension arm connected to the second end of the rotating arm and further connected to the edge of the inner rotatable plate to rotate the inner rotatable plate in the second direction.

19. The method for displaying and retracting a placard in an aircraft galley as defined in claim 18 wherein the step of rotating the outer rotatable plate in the first direction with the linkage comprises:
compressing the second compression/tension arm;
rotating the rotating arm; and,
exerting tension on the first compression/tension arm to rotate the outer rotatable plate in the first direction.

20. The method for displaying and retracting a placard in an aircraft galley as defined in claim 16 wherein the step of rotating the rotatable plate in the first direction responsive to contact by the first edge of a second galley cart further comprises:
compressing the first compression/tension arm connected to the edge of the outer rotatable plate;
rotating the rotating arm connected at the first end to the first compression/tension arm and mounted to the pivot on the surface of the cart storage bay; and,
exerting tension on the second compression/tension arm connected to the second end of the rotating arm and further connected to the edge of the inner rotatable plate to rotate the inner rotatable plate in the second direction allowing insertion of the second galley cart under both the rotated plates.

\* \* \* \* \*